(12) United States Patent
Charzinski et al.

(10) Patent No.: US 7,647,425 B2
(45) Date of Patent: Jan. 12, 2010

(54) EFFICIENT INTRA-DOMAIN ROUTING IN PACKET-SWITCHED NETWORKS

(75) Inventors: Joachim Charzinski, München (DE); Christoph Reichert, Berlin (DE); Karl Schrodi, Geretsried (DE); Gert Willmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 697 days.

(21) Appl. No.: 10/525,153

(22) PCT Filed: Aug. 20, 2003

(86) PCT No.: PCT/EP03/09231
§ 371 (c)(1),
(2), (4) Date: Oct. 11, 2005

(87) PCT Pub. No.: WO2004/019565
PCT Pub. Date: Mar. 4, 2004

(65) Prior Publication Data
US 2006/0155872 A1    Jul. 13, 2006

(30) Foreign Application Priority Data
Aug. 21, 2002    (DE) ............................. 102 38 291

(51) Int. Cl.
*G06F 15/173* (2006.01)
(52) U.S. Cl. .................. 709/239; 709/238; 709/245
(58) Field of Classification Search .................. 709/239
See application file for complete search history.

(56) References Cited
U.S. PATENT DOCUMENTS 5,623,492 A * 4/1997 Teraslinna ............... 370/397
5,917,820 A * 6/1999 Rekhter ................... 370/392
6,185,619 B1   2/2001 Joffe et al.
6,337,861 B1 * 1/2002 Rosen ..................... 370/389
6,856,991 B1 * 2/2005 Srivastava ................ 707/10

(Continued)

FOREIGN PATENT DOCUMENTS

EP    0 465 090 A1    1/1992

(Continued)

OTHER PUBLICATIONS

Eric C. Rosen, "A Proposed Architecture for MPLS" [online], Aug. 1997 [retrieved on Nov. 3, 2008], Internet Engineering Task Force, Internet Draft, Retrieved from http://tools.ietf.org/id/draft-ietf-mpls-arch-00.txt, pp. 1-59.*

(Continued)

*Primary Examiner*—Jeffrey Pwu
*Assistant Examiner*—Youpaporn Nilanont (57) ABSTRACT

The invention relates to the routing of data packets in a packet-switched network, e.g. in an autonomous system, having traffic distribution. According to the invention, the forwarding or the routing of data packets occurs via the access interface based on an item of information and via the output interface of the data packet based on an item of information. Both these items of information are, for example at the input interface, placed in front of the data packet in the form of information fields or labels. The invention enables, with a moderate expense and limited degree of complexity, a flexible and loop-free routing under the terms of a traffic distribution.

14 Claims, 4 Drawing Sheets

U.S. PATENT DOCUMENTS

| | | | |
|---|---|---|---|
| 6,937,574 B1* | 8/2005 | Delaney et al. | 370/254 |
| 6,944,159 B1* | 9/2005 | Fotedar et al. | 370/392 |
| 2002/0083174 A1* | 6/2002 | Hayashi et al. | 709/225 |
| 2002/0176363 A1* | 11/2002 | Durinovic-Johri et al. | 370/237 |
| 2003/0031192 A1* | 2/2003 | Furuno | 370/409 |

FOREIGN PATENT DOCUMENTS

EP    1 045 553 A2    10/2000

OTHER PUBLICATIONS

Cisco Systems, "Cisco AVVID Network Infrastructure Enterprise Quality of Service Design" [online], Aug. 2002 [retrieved on Nov. 5, 2008], Retrieved from http://ictlab.tyict.vtc.edu.hk/~tsangkt/mc/Reference/QOS%20for%20AVVID.pdf, chapter 6.*

Eric C. Rosen, "Multiprotocol Label Switching Architecture" [online], Jan. 2001 [retrieved on Oct. 30, 2008], Internet Engineering Task Force, RFC 3031, Retrieved from http://www.ietf.org/rfc/rfc3031.txt.*

Cisco Systems, "Cisco AWID Network Infrastructure Enterprise Quality of Service Design" [online], Aug. 2002 [retrieved on Nov. 5, 2008], Retrieved from http:llictlab.tyict.vtc.edu.hkl-tsangktImcIReferencelQOS%20for%20AWID.pdf, chapter 6.*

Downey, T, Overview to tag switching:, Electronics Industries Forum of New England, 1997, Professional Program Proceedings, Boston, MA, USA, May 6-8, 1997, New York, NY, USA, IEEE, US, May 6, 1997, pp. 61-66, XP010234255.

Simpson, W, "IP in IP Tunneling", Network Working Group RFC 1853, Oct. 1995, XP002051505, Retrieved from the Internet: <URL:HTTP://WWW.IT.KTH.SE/DOCS/RFC/RFCS/RFCL1853.TXT.

* cited by examiner

FIG 1

T1-T9 = Terminal Devices
K1-K3 = Nodes
L13, L12, L23 = Links
N1-N4 = Networks

PRIOR ART

| Origin | Destination | Path 1 | Path 2 |
|---|---|---|---|
| N2 | N3 | K1-K2 | K1-K3-K2 |
| N2 | N4 | K1-K3 | K1-K2-K3 |
| N3 | N2 | K2-K1 | K2-K3-K1 |
| N3 | N4 | K2-K3 | K2-K1-K3 |
| N4 | N2 | K3-K1 | K3-K2-K1 |
| N4 | N3 | K3-K2 | K3-K1-K2 |

Node K1:

| Destination | Next hop | Alternative next hop |
|---|---|---|
| N1 | local | local |
| N2 | local | local |
| N3 | K2 | K3 |
| N4 | K3 | K2 |

N1 - N4 = Networks
K1 - K3 = Nodes

Node K2:

| Destination | Next hop | Alternative next hop |
|---|---|---|
| N1 | local | - |
| N2 | K1 | K3 |
| N3 | local | - |
| N4 | K3 | K1 |

Node K3:

| Destination | Next hop | Alternative next hop |
|---|---|---|
| N1 | local | - |
| N2 | K1 | K2 |
| N3 | K2 | K1 |
| N4 | local | - |

PRIOR ART

FIG 3

N1 - N3 = Networks
K1 - K2 = Nodes
IL = Ingress Label
EL = Egress Label
LC = Label Code

FIG 4

Table for determining the EL: Egress Label

| Destination | Output node | EL |
|---|---|---|
| N2 | K1 | KN1 |
| N3 | K2 | KN2 |
| N4 | K3 | KN3 |

Node K1:

| EL | IL | Next hop | Alternative next hop |
|---|---|---|---|
| KN2 | KN1 | K2 | K3 |
| KN2 | KN3 | K2 | - |
| KN3 | KN1 | K3 | K2 |
| KN3 | KN2 | K3 | - |
| KN1 | * | EGP | |

IL = Ingress Label
EL = Egress Label

N1 - N4 = Networks
K1 - K3 = Nodes
KN1 - KN3 = identifiers of ingress & egress nodes Node K2:

| EL | IL | Next hop | Alternative next hop |
|---|---|---|---|
| KN1 | KN2 | K1 | K3 |
| KN1 | KN3 | K1 | - |
| KN3 | KN2 | K3 | K1 |
| KN3 | KN1 | K3 | - |
| KN2 | * | EGP | |

Node K3:

| EL | IL | Next hop | Alternative next hop |
|---|---|---|---|
| KN1 | KN3 | K1 | K2 |
| KN1 | KN2 | K1 | - |
| KN2 | KN3 | K2 | K1 |
| KN2 | KN1 | K2 | - |
| KN3 | * | EGP | |

US 7,647,425 B2

EFFICIENT INTRA-DOMAIN ROUTING IN PACKET-SWITCHED NETWORKS

CROSS REFERENCE TO RELATED APPLICATIONS

This application is the US National stage of International Application No. PCT/EP2003/009231, filed Aug. 20, 2003 and claims the benefit thereof. The International Application claims the benefits of German application No. 10238291.3 filed Aug. 21, 2002, both applications are incorporated by reference herein in their entirety.

FIELD OF THE INVENTION

The invention relates to a method, an edge router and an internal router for routing data packets in a packet-switched network with traffic distribution

BACKGROUND OF THE INVENTION

An important area of work for network technicians, and routing and internet experts, is the further development of packet-switched networks. An important objective of this further development is to be able to offer a comprehensive spectrum of services over packet-switched networks.

Apart from the conventional applications for data transmission, ever more services with real-time requirements, such as telephone (e.g. Voice over IP) and the transmission of image data in real time (e.g. video on demand, video conferences), are to be realized over packet-switched networks. From this arise new requirements which the packet-switched networks must meet. Adherence to quality characteristics for services with real-time requirements—frequently referred to in this context as the 'quality of service', abbreviated to QoS—is of central importance.

The packet-switched networks which are currently most popular are based on the IP (Internet Protocol) protocol. The success of these is to a large extent explained by their comparatively low complexity and high flexibility. Both of these arise from the way that packets are forwarded in the IP network.

Within IP networks, the packets are routed by reference to their IP addresses. In the large majority of cases, the routing is effected on a per-hop basis, i.e. by reference to the packet address the routers identify a destination, normally another router, to which the packet concerned is forwarded. At the end of the transmission via a chain of routers, the packet is delivered to the destination address, often a host or a gateway.

In general, no information relating to the transmission path is available to an individual router apart from details of the next hop or the next stage, as applicable. As a result, the maintenance and administration of the routing tables requires little effort. In addition, the method is flexible to the extent that alternative and default destinations can be provided for the next hop which, for example, ensure that the packet can be forwarded in the event of a malfunction or unknown addresses.

IP networks using conventional routing techniques are not very suitable for real-time traffic. Delays to packets, and their loss, are not subject to sufficiently stringent controls to be able to guarantee the quality characteristics necessary for real-time transmission.

Methods for better control of the transmission parameters include the reservation of transmission capacity for services with real-time requirements, and the specification of transmission paths in the network. The RSVP (Resource Reservation Protocol) signaling protocol was developed for the purpose of reserving bandwidth in IP networks. The RSVP protocol is used with, among others, the MPLS (Multi-Protocol Label Switching) protocol which permits the transmission path to be defined. The MPLS protocol provides for a packet, when it enters into a network, to be allocated a label by an LSR (Label Switching Router) edge router, which defines an LSP (Label Switched Path) path through the network. The packet is then forwarded by internal LSR (Label Switching Router) routers according to the LSP path defined by the label.

A choice of path is also made as part of the ATM (Asynchronous Transfer Mode) technique, and for IP networks can also be effected by means of the Source Route Option of the IP datagram (although in practice this is seldom supported).

The reservation of paths permits guarantee statements in respect of a QoS transmission, but is associated with high complexity and the loss of flexibility (by comparison with "best effort" packet-switched networks).

SUMMARY OF THE INVENTION

The object of the invention is efficient routing in terms of a QoS transmission over a packet-switched network, while avoiding the disadvantages of conventional methods.

This object is achieved by the claims.

As part of the invention, a method is proposed for the routing of data packets in a packet-switched network with traffic distribution. With this method according to the invention, a data packet is forwarded or routed, as applicable, by an internal router within the data network, with the forwarding or routing respectively of the packet being effected by reference to at least two items of data. One of these two items of data is the interface or node, as applicable, where the data packet came into the packet-switched network, and the second item of data is the interface or node, as applicable, where the data packet is to leave the data network. By contrast with conventional methods, such as the ATM technology or the MPLS technology, no complete path through the packet-switched network is defined. The only items fixed are the point at which the data packet accesses the network, and the point or interface where the data packet leaves the data network again. Within the packet-switched network use is made of traffic distribution. That is to say, for example, that alternatives are prescribed for routers to use in forwarding data packets, which they can use for the routing, for example if a link goes down or as part of a statistical distribution over alternative paths. For the definition of ingress or egress points for data packets (i.e. the interfaces at which the data packets respectively come into the network or leave the network again), identifiers can be issued, for example, at edge nodes or ports of edge nodes, as applicable. An identifier of this type would then indicate respectively the node or the port of the node, at which the data packet comes into the packet-switched network or is to leave the packet-switched network, as applicable.

Here, the term internal router or internal node is relative to the forwarding of the data packet through the packet-switched network, and includes all the routers or nodes, as applicable, which are not identical with the entry or exit nodes. The set of routers which have interface functions with respect to other networks, and topologically are located on the edge of the network, are called edge routers. The complementary routers are then called core routers. In the context of this terminology, the term internal router is not identical with core router. If, for example, the path of the data packet when it is routed through the packet-switched network passes through several core routers, only those two core routers at which the data packet respectively enters and leaves the network are also internal routers in the sense of the description.

In the case of the packet-switched network, it can also be a partial network or subnetwork. In IP (Internet Protocol) systems there are, for example, network architectures in which the network as a whole is subdivided into networks called "autonomous systems". The network according to the invention could be, for example, an autonomous system or that part or the whole network which lies within the area of responsibility of a service provider (e.g. ISP: internet service provider). In the case of a subnetwork, service parameters can be defined for transmissions through the whole network, by traffic control within the subnetworks and efficient communication between the subnetworks.

In a packet-switched network, traffic distribution is exercised. With this, routers in the data network can distribute traffic to alternative next stations or hops, as applicable. This distribution can be effected, for example, for each packet or for each flow. Routing via alternative routes or paths, as appropriate, can be exercised in the event of the failure of connecting links or with the object of a more uniform distribution of the data traffic. The invention permits local decisions about the forwarding of data packets by reference to data about the entry and exit points. In general, the paths of data packets are not rigidly defined when they enter into the packet-switched network.

The invention has the advantage of greater flexibility compared to methods which provide for the complete definition of the trans-mission path. Access controls at the edge of the network can be used to ensure that the traffic incidence within the network remains within limits which permit transmissions with the QoS level. By means of traffic distribution within the network, it is possible to ensure that no bottlenecks arise on individual links. Problems of conventional packet-switched networks, such as the circulation of packets, are avoided.

The involvement of data about the origin in a router's forwarding decision makes it possible to permit a greater diversity of paths than with classical IP routing or ECMP (equal cost multipath). The associated increase in the complexity of the routing tables is kept small in a network by the reduction of the routing tables to data relating to the entry and exit points (e.g. the ingress and egress node numbers); the resulting routing tables will generally be smaller than with classical IP routing. In contrast to MPLS, no explicit construction of paths is required, and all the network components can autonomously exploit the path diversity, to achieve a distribution of the traffic or fast local reaction to faults.

Three possibilities for supplying the internal routers with the data about the entry and exit points are sketched out below.

For example, at the entry point the data packet can be provided with one of more data fields or labels, as appropriate, containing the data relating to the entry and exit points for the data packet. This data field or fields, as applicable, can be prepended or attached to the data packet as a header or trailer respectively. Here, a data field can either contain the information about both the entry point and the exit point, or alternatively there can be a separate data field each for the data about the entry point and the exit point respectively. A bit sequence can be prefixed to the data fields or labels, as applicable, to identify them as such. One option is to make use of MPLS labels, and to issue an MPLS label for each pair of ingress and egress nodes. For each of the labels, various alternative paths within the data network will then be defined. For the routing within the network, the internal router can then identify the label and make local decisions about which of the paths associated with the label to forward the data packet along. Logically, data packets in an end-to-end flow, i.e. data packets with the same origin and destination address data (e.g. IP addresses and possibly TCP port numbers) will be routed along the same path, in order to maintain the sequence of the data packets.

Data fields which were added to the data packet at either an ingress node or ingress router to the data network, as applicable, can be removed again at the egress point or egress router, as applicable. For example, routing tables can be maintained in the internal routers, defining a relationship between the data about the data packet's access interface and the data about the egress interface, on the one hand, and an address for the forwarding of the data packet. A table of this sort then comprises, for each pair of access and egress interfaces, the address of the next hop for the data packet. In addition to this, further alternative addresses can be arranged in the table, for use in traffic distribution or as a backup in the event of malfunctions or delays on one of the outbound links from the internal router. Instead of classically organized tables, it is also possible to perform a search using modern search structures and algorithms which, for example, proceed according to a tree structure.

Another option for communicating to the internal router the data about the access interface or egress interface for the data packet is to make use of existing unused fields in the data packet. For example, the use of the source-route option of an IP datagram for storing address data for the data packet's ingress and egress interfaces is conceivable. These items of data would then be written into the datagram on its entry into the network, and then extracted from the datagram by the internal node in the course of the routing decision. The data about the access interface or egress interface, as applicable, could then be removed again from the fields in the data packet when it leaves the network, so that these fields are then available again for their original purposes.

A third possibility is that the internal nodes identify the access point and the designated egress point for the data packet by reference to address data extracted from the data packet.

It is also possible to use an approach to the determination of the data about the interface at which the data packet accesses the packet-switched network and the data about the egress interface, at which the data packet is to leave the data network, which differs for the ingress and egress points.

For example, when a packet enters the network the packet can be provided with a data field containing the identifier of the entry node. The internal router then extracts this identifier and, for example, uses a table to determine the egress node. Other combinations of different procedures, for determining the two items of data relating to the ingress interface and the egress interface, are also possible.

BRIEF DESCRIPTION OF THE DRAWINGS

The invention is explained in more detail below in the context of an exemplary embodiment, by reference to figures, in which.

DETAILED DESCRIPTION OF THE INVENTION

Figure 1:
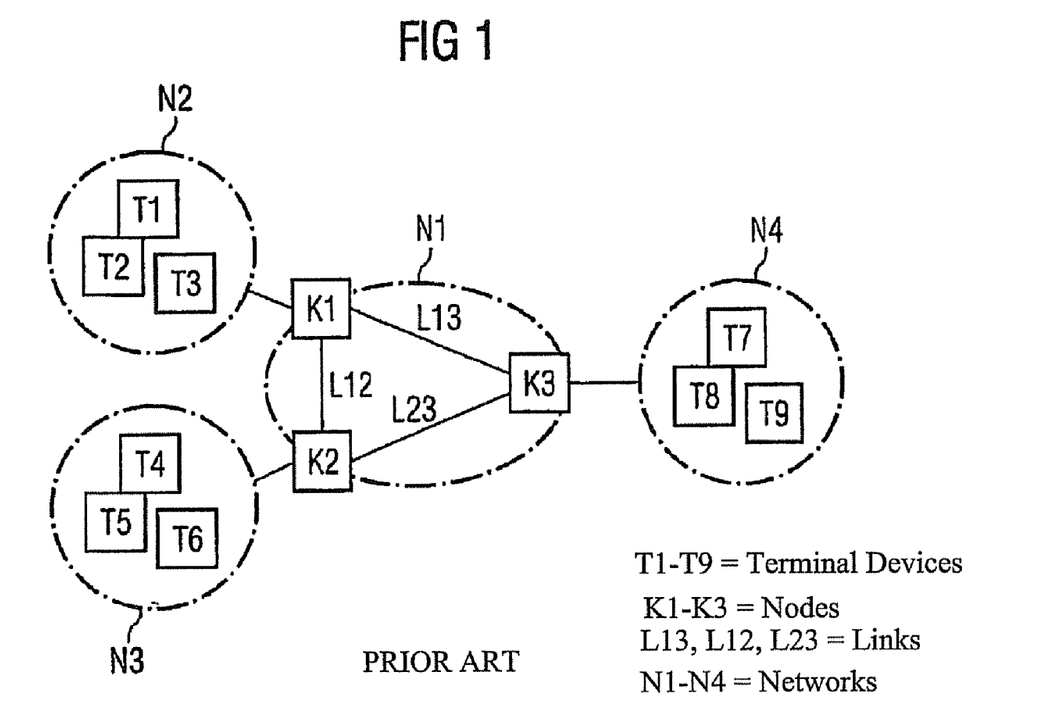
FIG. 1 shows a simplified representation of a packet-switched network

FIG. 1 shows a simplified representation of a packet-switched network N1. Connected to the packet-switched network N1 are the networks N2 to N4. The networks N1-N4 allow the subscriber stations or terminal devices T1-T9 to communicate with each other. Here, there are three terminal devices connected to each of the networks N2, N3 and N4 (T1-T3, T4-T6 and T7-T9). The packet-switched network N1 incorporates the nodes K1, K2 and K3, which are connected to each other via the connecting lines or links, L12, L13, L23. The upper-most table in FIG. 2 specifies two paths for each of the various pairs of origin and destination networks. The first path specified represents the preferred path for a routing, which is aimed at the (minimal) number of intermediate stations or hops, as applicable. The second path represents in each case an alternative path which, for example, can be used as a substitute in the event of malfunctions or bottlenecks. By way of example, consider a data transmission from the network N2 to the network N3. The "least cost" path goes via the nodes K1 and K2. The alternative path avoids the link L12 by providing a forwarding chain K1-K3-K2. This alternative path will be used, for example, if the link L12 goes down.

Figure 2:
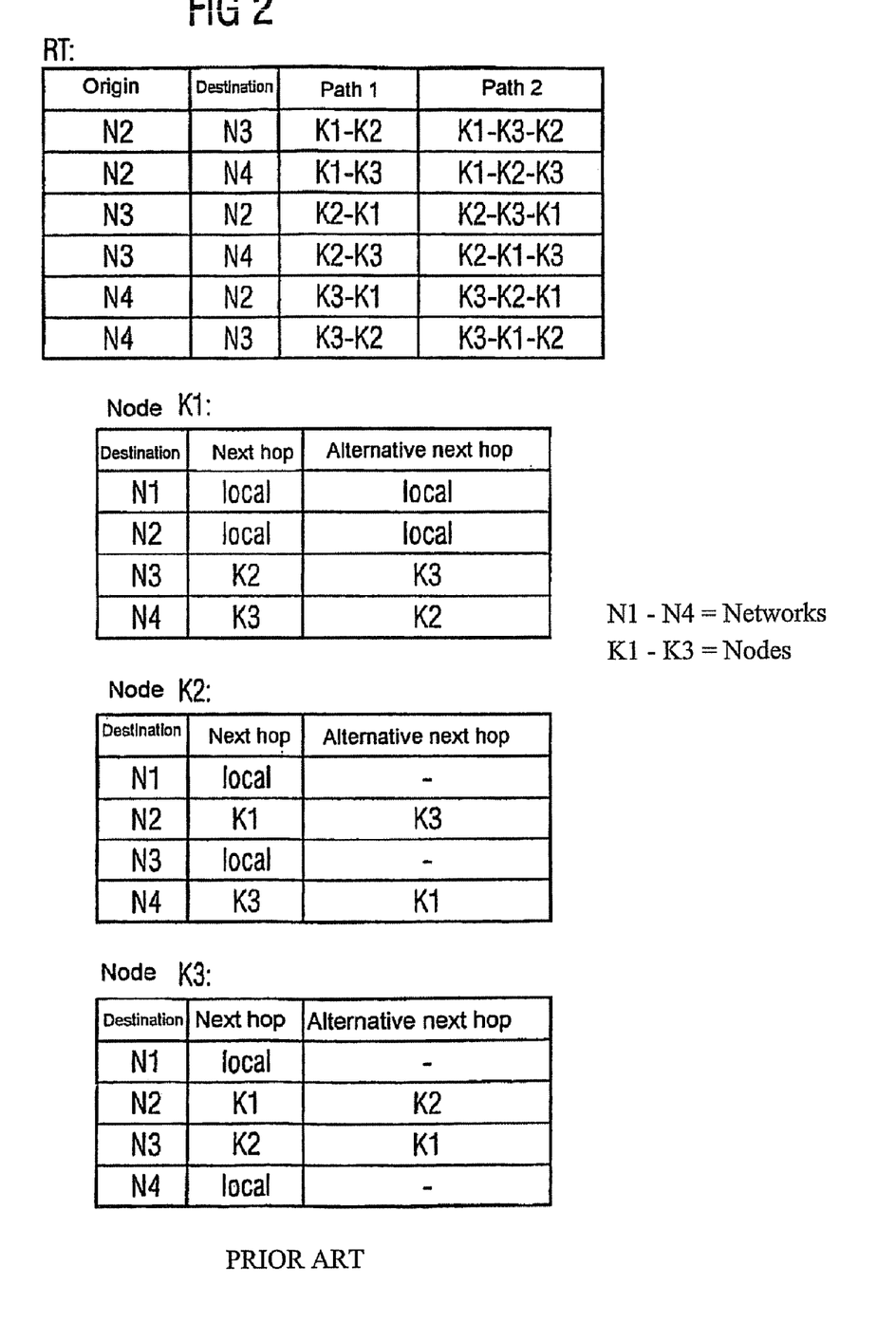
FIG. 2 shows conventional routing tables for the typical network shown in FIG. 1

The second to fourth tables in FIG. 2 show conventional routing tables in the nodes K1, K2 and K3. For a particular destination, each table shows the next station or hop, as applicable, and an alternative, corresponding to the paths specified in the uppermost table. As shown by the routing table in node K1, data packets addressed to the network N1 can be communicated directly (locally) to the connected network N1. This situation is represented in the table by the fields containing the term "local". Data packets directed to the network N3 are preferably routed on to the node K2. As an alternative destination, the node K3 is tabulated. In an analogous way, data packets directed to the network N4 are preferably routed to the node K3, and alternatively to the node K2. The routing tables for nodes K2 and k3 are to be interpreted correspondingly.

This combination of routing tables would permit, for example, a data packet which is sent from the network N2 to the network N3 and which enters the network N1 at node K1 to be passed on initially to the node K3, and by this latter to then be passed back to the node K1. Such cases can arises, for example, with load balancing for the purpose of improved utilization with L1 the packet-switched network N1 over the preferred and alternative paths. If, for example, data packets basically have an eighty percent probability of being routed along the preferred path and a twenty percent probability of being routed via the alternative path, then this situation occurs with a probability of 0.2*0.2*100=4%. I.e. loops occur. Loops must particularly be avoided if traffic restrictions and traffic controls in respect of QoS guarantees are applied at the boundaries of the packet-switched network N1.

Using classical IP routing, which only takes into consideration the destination address of a packet, this problem cannot be solved without restricting the path diversity. In the present example, it would be necessary to remove the alternative paths for at least two of the nodes in order to guarantee loop-free forwarding. This is at the same time the maximum path diversity which can be achieved using such mechanisms as ECMP (equal cost multipath) with manual setting of the cost parameters, or using the EIGRP (enhanced interior gateway routing protocol) and unequal cost multipath routing.

One option for getting round the destination-based routing is the presetting of the transmission path, e.g. as part of the MPLS concept. In this case, a number of bits (a "label") are prefixed to each IP packet, giving a path reference. However, MPLS has the disadvantage that the original choice of path made by the router at the ingress point to the network (the "ingress router") cannot then be modified by subsequent nodes on the path.

Figure 3:
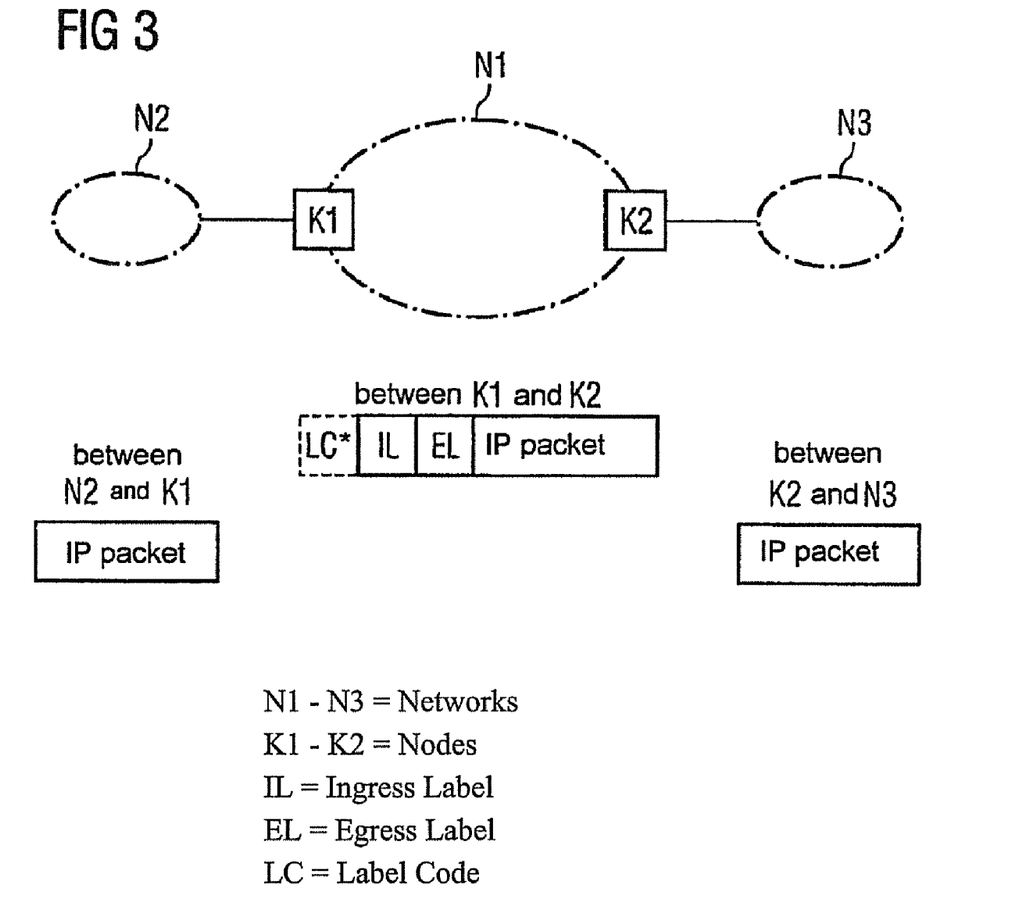
FIG. 3 shows a schematic diagram of how labels are used according to the invention

FIG. 3 illustrates the method according to the invention using data fields or labels for routing with the packet-switched network N1. It shows the packet-switched network N1 together with the networks N2 and N3. A data packet which is to be transmitted from network N2 to network N3 is modified at node K1, i.e. at its ingress router. The labels EL (for Egress Label) and IL (for Ingress Label) are attached as a header to the data packet. The label IL includes an identifier for the ingress router and the label EL includes an identifier for the egress router, at which the data packet is to leave the network again. As an option, an additional bit sequence LC* (LC for label code) can identify the labels IL and EL as such. FIG. 3 shows schematically an IP packet with such labels EL, IL and LC, which are added when the data packet enters the network N1 at node K1 and are removed again when it leaves the network N1 at node K2.

The contents of the labels EL and IL are: for IL the number of the node K1 and for EL the number of the node K2. These node numbers can be issued, for example, during installation of the network nodes, so that within any packet-switched network or autonomous system (the latter expression is frequently encountered in English-language literature) which is under consideration they are in each case unique. Each ingress node to the network can use its own node number as the IL label. The node number of the egress node or the label EL, as applicable, can be determined by reference to classical packet-switched network routing data, e.g. the destination IP address recorded in the packet. The node number thus determined for the egress node will then be used as the label EL.

Within the network it is now no longer necessary to consider the origin and destination addresses in the header of the data packet. The next node can be determined solely by reference to the data fields IL and EL (or a single combined label) prefixed to the packet. By this means, the routing tables are substantially reduced in size. Furthermore, by combining the data fields IL and EL to form a pseudo MPLS label, the communication format of the packets could be kept compatible with MPLS.

Figure 4:
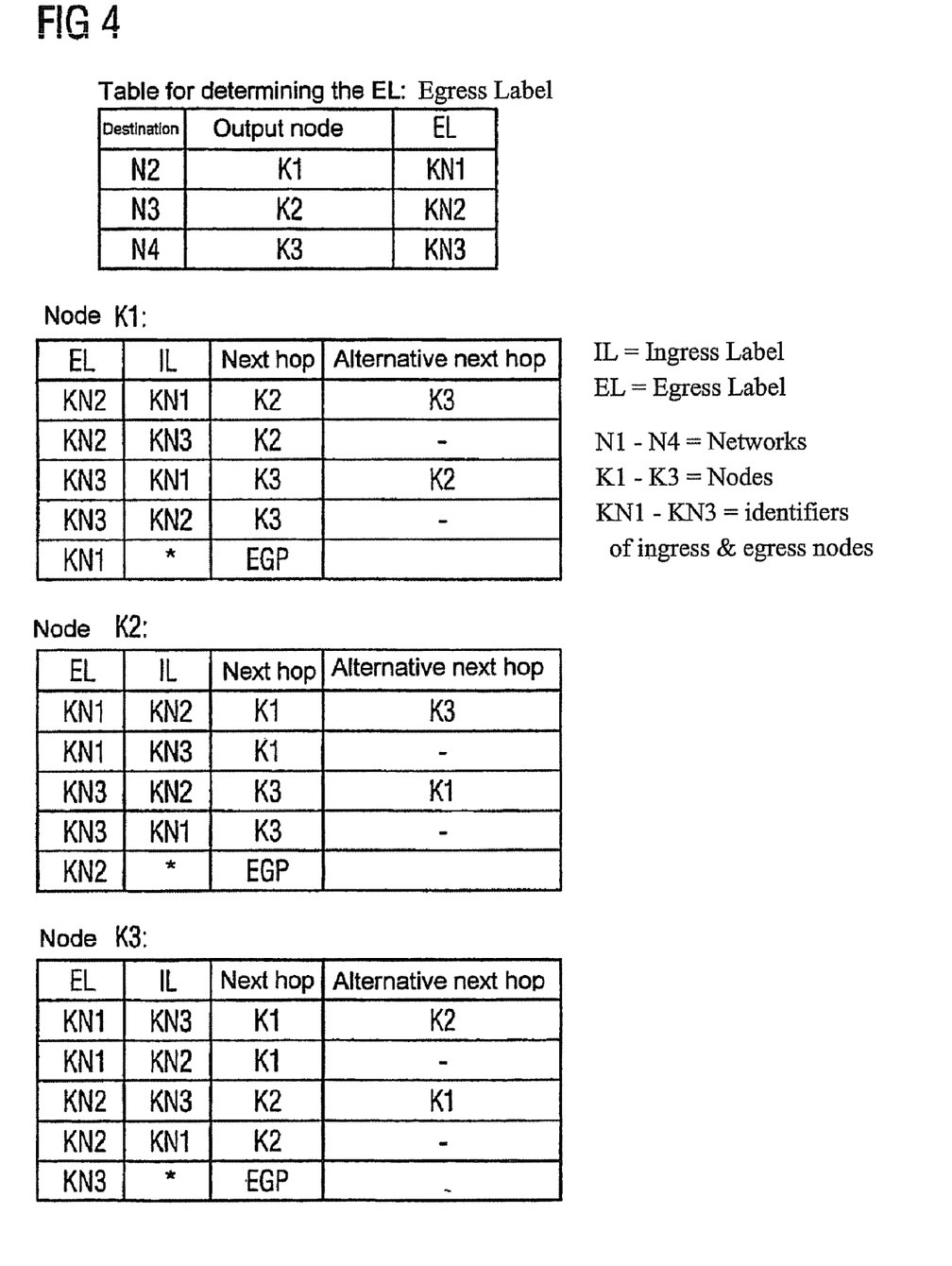
FIG. 4 shows routing tables according to the invention

FIG. 4 shows routing tables according to the invention for the example shown in FIG. 1. To the nodes K1, K2 and K3 are assigned the node numbers or node identifiers, as applicable, KN1, KN2 and KN3. An ingress node, for example node K1, then uses its own node number, i.e. KN1 for node K1, for the label IL. The node identifier for the label EL is determined by reference to a table. Each network node in N1 which is connected to external networks then has a table for use in determining the egress node. An example of such a table is given by the uppermost table in FIG. 4. When a data packet is transmitted from the network N2 to the network N3, the ingress node K1 extracts from the aforementioned table in FIG. 4 the node number KN2 for the egress node K2. The node number KN2 is then used for the label EL. In the table, the networks N2, N3 and N4 each stands for its network nodes and all the further networks which can be reached through it. The tables for determining the EL have roughly the size of a BGP routing table (BGP: Border Gateway Protocol). Correspondingly, the search effort to determine a label EL will also be of a similarly moderate level as for the determination of a next-hop router using the BGP protocol.

The other tables in FIG. 4 are the analogs of the routing tables in FIG. 2 for the method according to the invention. The routing tables now have one entry for each ingress/egress node pair. If the packet is to leave the network N1 at one of the nodes, the label is removed again and the next node is determined using the external routing protocol (in the literature the expression exterior gateway protocol, abbreviated to EGP, is common). The BGP (border gateway protocol) is often used for this purpose. For example, suppose a data packet is sent from the network N2 to the network N3. The ingress node K1 determines the egress node K2, and prefixes the identifiers KN1 and KN2 of the ingress and egress nodes to the data packet as a label. According to the routing table for the node K1 in FIG. 4, for the egress/ingress label pair KN2 and KN1 the preferred next node is K2. As an alternative, the data packet is routed to the node K3. In the first case—as stipulated in the third table in FIG. 4—the next hop will be determined by node K3 using an EGP protocol (here, the asterisk is a dummy which stands for any arbitrary node identifier). In the second case—lowermost table in FIG. 4—node K3 determines the node K2 as the next hop. There is no alternative hop or alternative address, as applicable. A loop is thereby avoided.

The node numbers can be issued manually when network nodes are installed. However, preference should be given to automated mechanisms. For this purpose, a protocol can be executed between the routers, by which they autonomously reach agreement on their node numbers (for example by reference to the sequence of their IP addresses in the network under consideration) and then distribute amongst themselves the tables for determining the egress label EL. If new nodes are inserted into a network which is currently in operation, they can each be given the next unallocated node number. In order to manage the process of combining previously separate networks which are currently in operation, further mechanisms are generally required.

One alternative to automatic self-configuration is configuration by a central station, for example as part of the network management procedures. To this end, a network can initially be started up in the normal IP routing mode. The node numbers are then issued by the network management procedures, and only then are the processes for attaching the labels and distributing the traffic across several paths started up.

In order to ensure that the free distribution of packets over various paths does not disrupt any sequence of packets which belong together semantically (for example packets for the same TCP link), a node at the network ingress can add to the label a further field, FI (flow identifier), containing for example a value calculated from the origin and a destination addresses for the packet (e.g. IP addresses and any port numbers). Subsequent nodes in the network must then either note in a dynamic table the path decision made for each value of the field FI, or must assign the FI values to particular routes in a systematic way (for example by splitting up the value range of FI). In the event of faults, the association between FI and path decision can be changed locally and dynamically at each node.

Using algorithms, the routing tables can either be calculated centrally and distributed to all the nodes, or they can be calculated autonomously in each node, for example using the link-state data exchanged with the help of the OSPF (Open Shortest Path First) protocol.

The method described can also be used without the communication of ingress/egress numbers in labels. To do this, two further tables are provided in each network node, using which it can calculate for itself the appropriate data for each packet. In this case, the EL table corresponds to the EL table explained above by reference to FIG. 4. A corresponding IL table can be created in the same way from the external (EGP) routing tables if symmetric routing is ensured in the EGP. Here, symmetric routing means that the path of data packets is invariant with respect to the direction of transmission, i.e. unaffected by swapping the origin and destination addresses in the header of the data packet. In creating an IL table, a relationship is set up between the origin addresses and the access interface or access node, as applicable. The access interface is determined for a particular data packet by using the EGP to determine the egress interface or egress node, as applicable, of data packets for which the destination address is the same as the origin address for the particular data packet. Due to the symmetry of the routing, the interface or node determined in this way will be the ingress interface or ingress node, as applicable, of the data package.

On grounds of security it is in any case often desired to check whether the origin address of an IP packet at its ingress into a network is in agreement with the physical ingress point, so this requirement for symmetrical routing may well be satisfied in future as a matter of course.

The concept can also be realized with only an ingress label IL. In this case the local routing tables would contain, instead of the egress label EL, the usual network addresses, and would be correspondingly larger, but the network ingress nodes would be saved from the need to look up the egress labels.

The invention claimed is:

1. A method for routing of data packets for avoiding circulation of the data packets, in a packet-switched network connected to a plurality of external networks, the method comprising:

assigning unique node identifiers to nodes of a packet switched network (N1);

providing a destination table that associates for each external network connected to the packet switched network (N1) an Egress Label (EL) based on the unique node number for the node that comprises an exit point to that external network;

providing a routing table for each node in the packet-switched network (N1) for forwarding data packets through the packet-switched network comprising Ingress/Egress Label (IL/EL) pairs, wherein the Ingress Label (IL) is based on the unique node number for the node that comprises an entry point into the packet switched network (N1), wherein each IL/EL pair is associated with next hop data;

appending a label to a data packet at an ingress node where the data packet enters packet-switched network (N1), wherein the label comprises an Ingress Label (IL) based on the unique node number for the node that comprises the entry point into the packet-switched network (N1) and an Egress Label (EL) extracted from the destination table by reference to the external network address in the data packet, representing the ingress node and an egress node where the data packet will enter and leave the packet-switched network (N1), respectively;

forwarding the data packet from the ingress node to the egress node by an internal router of the packet-switched network by accessing the routing table for each node traversed in the packet-switched network, and reading the next hop data for the IL/EL pair that coincides with the label; and providing alternative loop-free routes for the forwarding of the data packet in the routing table for each IL/EL pair when an alternate next hop is available, wherein loops are avoided because the ingress node identified by the IL is excluded as an alternative route, wherein the data packet is supplied with two data fields, wherein each of the data fields is added to the data packet as a header or a trailer, wherein one of the data fields includes an identifier for the ingress node and the other data field includes an identifier for the egress node, and wherein a bit sequence is appended to or prefixed to at least one data field, identifying the data field as such.

2. The method according to claim 1, further comprising:

providing the data packet at the ingress node with identification data used by the internal router to identify the ingress node and egress node.

3. The method according to claim 2, wherein the identification data include an identifier or a network address for the ingress node and egress node.

4. The method according to claim 3, wherein at the ingress node the data packet is supplied with a data field, and wherein the internal router takes from the data field the data about the ingress node at which the packet entered the packet-switched network and the data about its egress node.

5. The method according to claim 4, wherein the data packet is supplied with a data field, wherein the data field is added onto the data packet as a header or a trailer, and wherein the data field includes an identifier for the ingress node and the egress node.

6. The method according to claim 5, wherein at the ingress node, the data packet is supplied with at least one data field, and wherein this data field is removed at the egress node.

7. The method according to claim 4, wherein at least one data field is provided by a Multiprotocol Label Switching label.

8. The method according to claim 3, wherein the identification data is written into a field provided as part of the format for the data packet.

9. The method according to claim 1, wherein the egress node is referenced by an identifier, wherein the identifier of the egress node is determined by reference to a network address in the network, to which the data packet is to be forwarded after it has traversed the packet-switched network, and wherein the determination of the identifier of the egress node is carried out at the ingress node by reference to the network address, using a table.

10. The method according to claim 1, further comprising:

supplying the data packet at the ingress node with an identification data used by the internal router for identifying the ingress node, wherein the identification data include an identifier or a network address for the ingress node; and determining the data about the egress node by the internal router by using address data extracted from the data packet.

11. The method according to claim 1, wherein the internal router determines the data about the ingress node and the data about the egress node by using address data extracted from the data packet.

12. The method according to claim 1, wherein the routing table assigns the data about the ingress node at which the data packet entered the packet-switched network and the data about the egress node to a network address for the next hop.

13. The method according to claim 1, further comprising:

supplying the data packet at the ingress node with a data field for identifying the flow; and performing the forwarding of the data packet by the internal router according to the data field.

14. An internal router in a packet-switched network having a plurality of nodes, connected to a plurality of external networks for performing a method for routing of data packets for avoiding circulation of the data packets, comprising:

a destination table that associates for each external network connected to the packet switched network an Egress Label (EL) based on a unique node number assigned to each node that comprises an exit point to that external network;

a routing table for each node in the packet-switched network for forwarding data packets through the packet-switched network comprising Ingress/Egress Label (IL/EL) pairs, wherein the Ingress Label (IL) is based on the unique node number for the node that comprises an entry point into the packet switched network, wherein each IL/EL pair is associated with next hop data;

wherein the internal router:

appends a label to a data packet at an ingress node where the data packet enters the packet-switched network, wherein the label comprises an Ingress Label (IL) based on the unique node number for the node that comprises the entry point into the packet-switched network and an Egress Label (EL) extracted from the destination table by reference to the external network address in the data packet, representing the ingress node and an egress node where the data packet will enter and leave the packet-switched network, respectively;

forwards the data packet from the ingress node to the egress node by an internal router of the packet-switched network by accessing the routing table for each node traversed in the packet-switched network, and reading the next hop data for the IL/EL pair that coincides with the label; and provides alternative loop-free routes for the forwarding of the data packet in the routing table for each IL/EL pair when an alternate next hop is available, wherein loops are avoided because the ingress node identified by the IL is excluded as an alternative route, wherein the data packet is supplied with two data fields, wherein each of the data fields is added to the data packet as a header or a trailer, wherein one of the data fields includes an identifier for the ingress node and the other data field includes an identifier for the egress node, and wherein a bit sequence is appended to or prefixed to at least one data field, identifying the data field as such.

* * * * *

UNITED STATES PATENT AND TRADEMARK OFFICE
CERTIFICATE OF CORRECTION

PATENT NO.        : 7,647,425 B2                                                Page 1 of 1
APPLICATION NO.   : 10/525153
DATED             : January 12, 2010
INVENTOR(S)       : Charzinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 947 days.

Signed and Sealed this

Sixteenth Day of November, 2010

David J. Kappos
*Director of the United States Patent and Trademark Office*